UNITED STATES PATENT OFFICE.

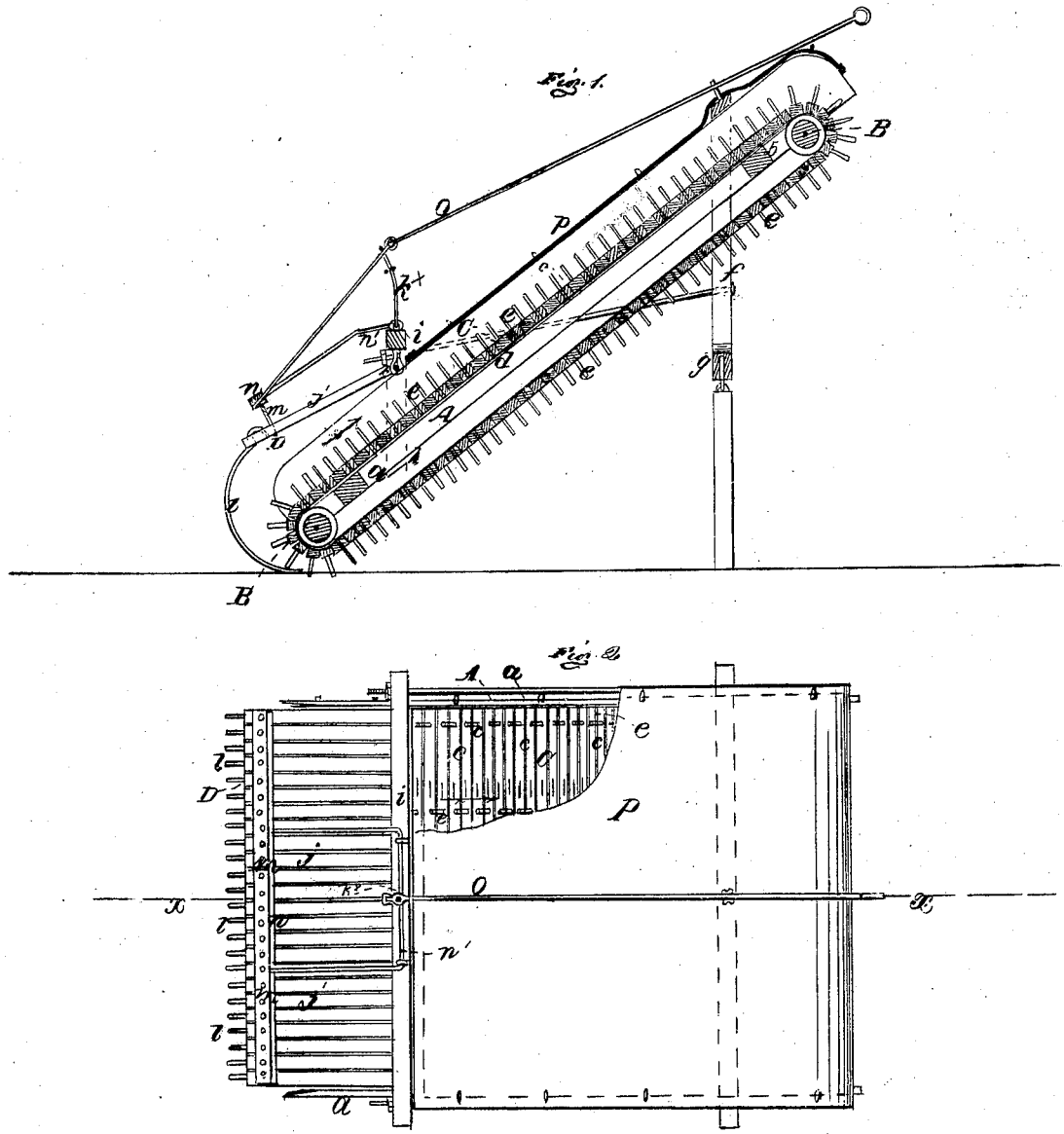

WM. PLATT AND A. G. BURNHAM, OF GREENFIELD, PENNSYLVANIA.

IMPROVEMENT IN HAY-LOADERS.

Specification forming part of Letters Patent No. 46,139, dated January 31, 1865.

*To all whom it may concern:*

Be it known that we, WILLIAM PLATT and A. G. BURNHAM, of Greenfield, in the county of Erie and State of Pennsylvania, have invented a new and Improved Hay-Loading Attachment to be applied to Carts and Wagons; and we do hereby declare that the following is a full, clear, and exact description of the same, reference being had to the accompanying drawings, making a part of this specification, in which—

Figure 1 is a side sectional view of our invention, taken in the line $x$ $x$, Fig. 2; Fig. 2, a plan or top view of the same.

Similar letters of reference indicate the same parts.

This invention relates to a new and improved device to be attached to a cart or wagon for the purpose of raking up the hay and elevating and discharging the same into the cart or wagon as the latter is drawn along in the field and over the hay.

To this end the invention consists in the employment or use of an endless toothed elevator and a rake, arranged and combined as hereinafter fully set forth.

To enable those skilled in the art to fully understand and make our invention, we will proceed to describe it.

A represents a framing, composed of two parallel side bars, $a$ $a$, connected by cross-bars $b$, and having a transverse roller, B, placed in it at its upper and lower end.

C is an endless toothed elevator, which works over the rollers B B, and is composed of a series of slats, $c$, attached to belts $d$. The teeth $e$ of this elevator may be straight, and they are fitted or driven in the slats $c$, any suitable or desired number being in each slat.

To each side of the framing A there is attached obliquely a pendent bar, $f$, and the lower ends of these bars $f$ are connected by a bar, $g$, the latter being connected by a central bolt to the center of a bar at the rear end of a hay-rack of the cart or wagon to be loaded. The framing A, when thus attached, has an inclined position about as shown in Fig. 1.

To the lower part of the framing A, at each side, there is attached a bar, $h$, the upper ends of the same being connected by a bar, $i$, extending transversely across the upper side of the framing.

D is a hay-rake, composed of a series of straight parallel bars, $j$, fitted at one end on a rod, $k$, which passes through the bars $h$ $h$, the rear ends of said bars having each a wire tooth, $l$, attached to it of the usual curved form, as shown in Fig. 1. The rear parts of the bars $j$ are connected by cords or chains $m$ with a bar, $n$, which is parallel with the bar $i$, and is connected thereto by a lever-frame, $n'$, provided with an upright, $k^*$, to which or to a rod passing through it a rod, $o$, is attached.

The rake-teeth $l$ extend down around the lower part of the elevator C, and when the device is attached to the cart or wagon and the latter drawn along the elevator will be moved in the direction indicated by the arrow, in consequence of the teeth $e$ penetrating the ground. The rake D gathers up the hay, which is carried up by the elevator C and deposited in the cart or wagon. The rake D may be elevated at any time when required by pulling the rod $o$.

The upper surface of the elevator may be covered by a cloth, $p$, to prevent the hay from being blown off from it by the wind.

Having thus described our invention, what we claim as new, and desire to secure by Letters Patent, is—

In combination with the elevator C, the arrangement of the rod $o$ and rocking frame $n$ $n'$, pivoted on the bar $i$, and connected to the rakes D, by which the latter are raised as may be required, substantially as described and represented.

WILLIAM PLATT.
A. G. BURNHAM.

Witnesses:
E. BURNHAM,
JAMES CHEASBRO.